April 23, 1968 SUGIAKI KUSATAKE 3,379,017
CONCRETE BLOCKS FOR SHORE AND BANK PROTECTION
Filed June 13, 1966 3 Sheets-Sheet 1

INVENTOR.
SUGIAKI KUSATAKE
BY
Mason, Fenwick & Lawrence
ATTORNEYS

April 23, 1968     SUGIAKI KUSATAKE     3,379,017
CONCRETE BLOCKS FOR SHORE AND BANK PROTECTION
Filed June 13, 1966     3 Sheets-Sheet 2
FIG. 7.
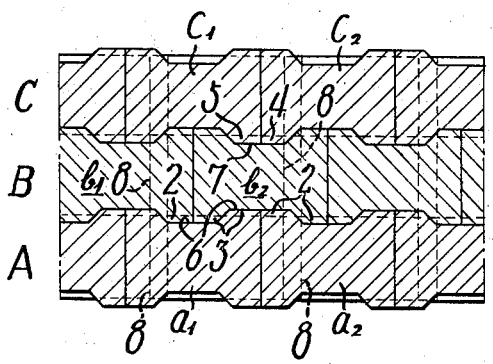
FIG. 8.
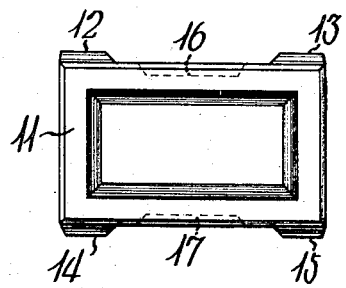
FIG. 9.
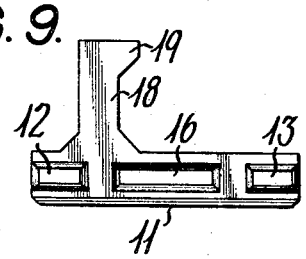
FIG. 10.
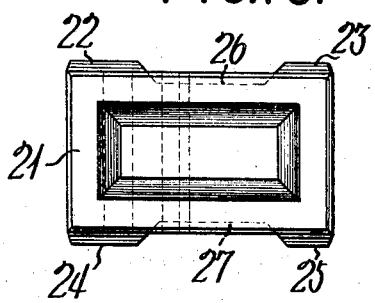
FIG. 15.
FIG. 12.
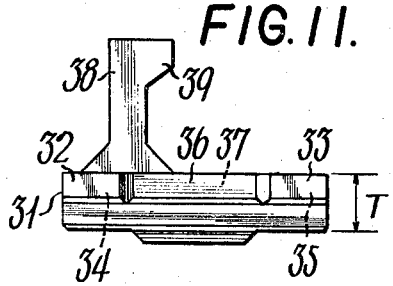
FIG. 11.
FIG. 14.
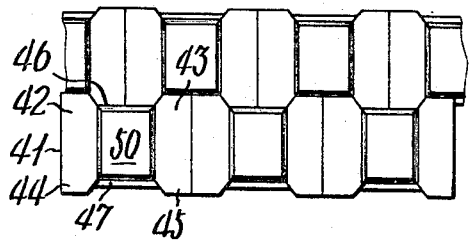
FIG. 13.
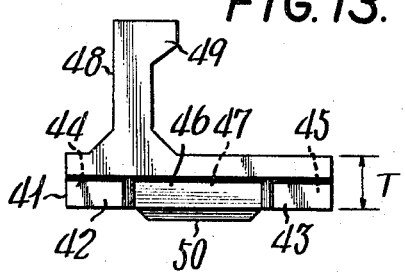
INVENTOR.
SUGIAKI KUSATAKE
BY Mason, Fenwick & Lawrence
ATTORNEYS

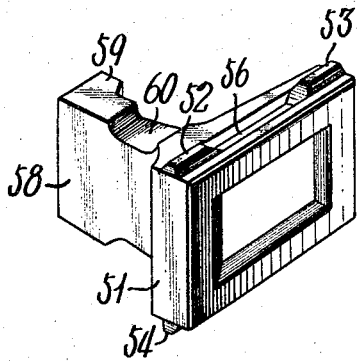
FIG. 16.
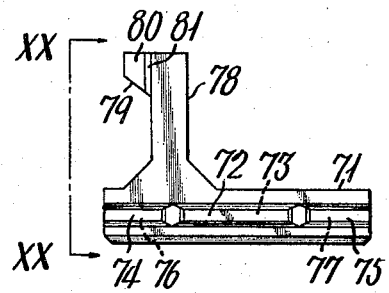
FIG. 19.
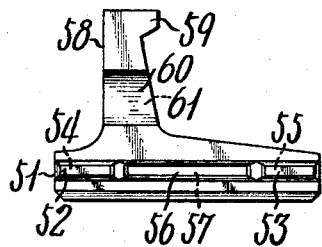
FIG. 17.
FIG. 20.
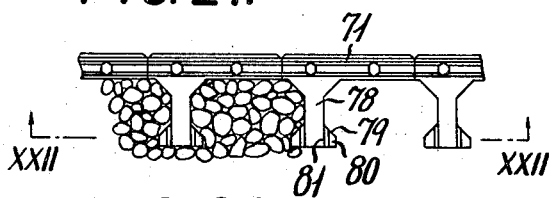
FIG. 21.
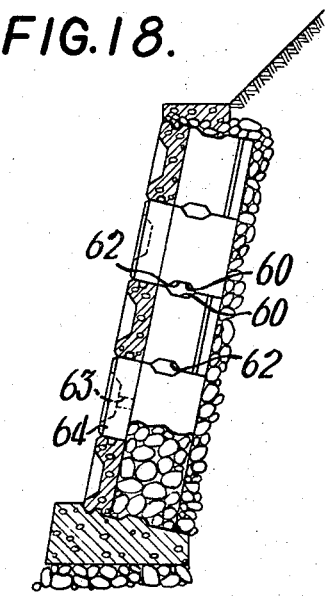
FIG. 18.
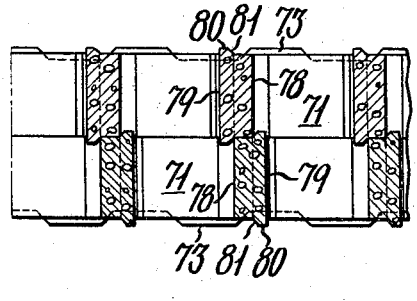
FIG. 22.
INVENTOR.
SUGIAKI KUSATAKE
BY
Mason, Fenwick & Lawrence
ATTORNEYS United States Patent Office 3,379,017
Patented Apr. 23, 1968

3,379,017
CONCRETE BLOCKS FOR SHORE AND
BANK PROTECTION
Sugiaki Kusatake, 132 Nishikitsuji-hachikencho,
Nara, Japan
Filed June 13, 1966, Ser. No. 557,284
Claims priority, application Japan, June 14, 1965,
40/48,368
9 Claims. (Cl. 61—37)

ABSTRACT OF THE DISCLOSURE

A block for use in the construction of a wall for river banks or seashores having a thickness in the form of a rectangular face plate provided on its upper and lower edges with a pair of halving joints, a prop member vertically extending behind the face plate in the position biassed inwardly by one quarter of the length of the face plate and a rib formed on one side of the tail end of the prop member, said prop member being formed with the same height as the face plate, said face plates being piled upside down in every other layer in a header formation with the result that the prop members of the face plates form a stiffener in a vertical straight line behind the wall and that the ribs of the tail ends of the prop members project right and left alternately.

---

Figure 1:
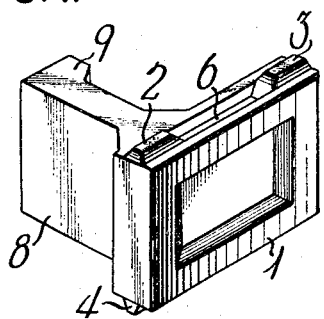

The present invention relates generally to concrete blocks used for the protection of edges or cliffs on the sea shore or river bank and more particularly to concrete blocks in which means is provided to strengthen a vertical and lateral combination of square blocks.

Blocks heretofore known in the art are those stones of suitable size or pieces of rock hewn or shaped which have been used since olden times for such construction purposes or those pieces of rock which are modified in shape and size. When such a block is made of concrete, it is formed into such a shape in which the face plate of a square block proper has a prop member protruding rearwardly thereof, said prop member being buried in the ground which it is intended to protect by means of said block proper, thereby to fix the vertical and lateral position of each square block face.

There has been introduced a new method in which an improved type of concrete block is used. According to the method, wires for binding purposes are embedded in the four corners of the face plate of the block proper so as to firmly secure the combination of one block with another and thereafter the gap between the face plates of the blocks thus bound together are joined with cement. But this method of combination requires the increased labor to bind wires by hand in addition to the usual labor to lay the concrete blocks and also filling of the gap with cement between the face plates of the blocks for the prevention of the binding wires from being bared, requiring increased cost of labor to cover a vast area.

A primary object of the invention is to provide blocks which can be combined with one another by the use of halving joint by forming projections and quirks on the upper and lower edges of the face plates of the blocks to be laid, thereby facilitating ranging of blocks uniformly in a longitudinal and lateral line, said projections and quirks being formed on the upper and lower edges of the face plates of the blocks proper which are to be disposed parallelly above and below one another and adapted to mesh with one another.

Another object of the invention is to form a stiffener of L-shape in plane in the form of a prop member vertically in a position biased to the right side or the left side on the rear surface of the face plate of the block proper and form a line of stiffeners arranged vertically on the vertical wall when a multiplicity of blocks are laid in a line, thereby to greatly strengthen the wall construction.

A further object of the invention is to construct a wall of a vast area by laying such blocks of only one kind in many steps when it is intended to form a wall by laying blocks.

A still further object of the invention is to make it possible with the aid of a characteristic rib prop to dispense with the trouble to fix the prop of each block with concrete every time the block is laid as was required by a conventional method by which a square pyramidal prop member is used and to form a protection wall of a substantially increased thickness by such a simple measure by which large spaces between one line of stiffeners and another line of stiffeners can be filled with concrete later at a time.

Figure 2:
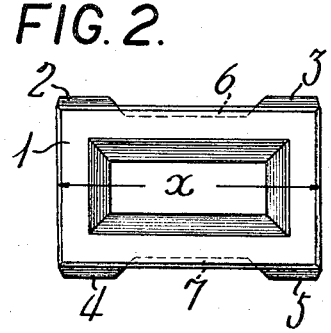
Figure 3:
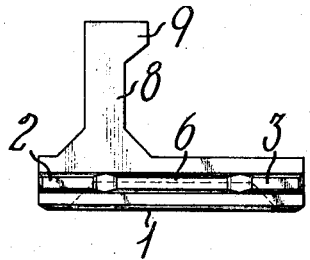
Figure 4:
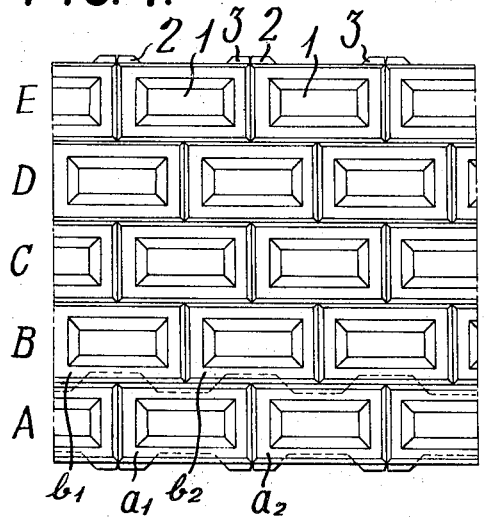
Figure 5:
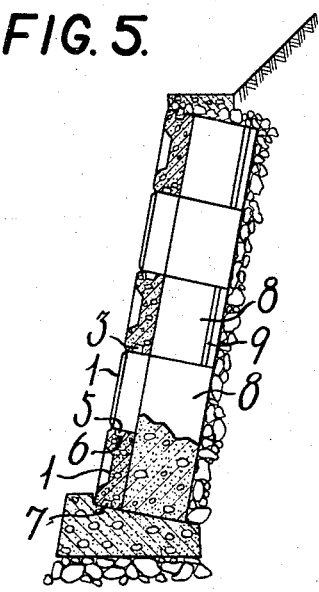
Figure 6:
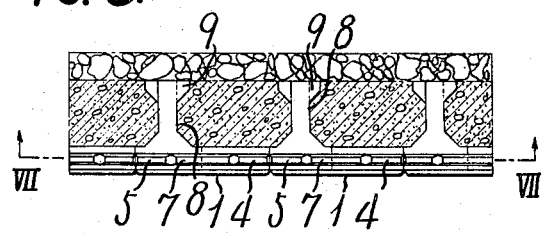

Other objects and advantages of the invention will be described in greater detail in the following detailed portion of the specification which may best be understood by the following drawings in which:

FIG. 1 is an elevational view of a typical type of block according to the invention;
FIG. 2 is a front elevational view of FIG. 1;
FIG. 3 is a plan view of FIG. 1;
FIG. 4 is a front elevational view of a wall surface by laying the blocks shown in FIG. 1;
FIG. 5 is a longitudinal side elevational view of the blocks laid to form a protection wall;
FIG. 6 is a plan view of FIG. 4;
FIG. 7 is a longitudinal sectional view taken along line VII—VII of FIG. 6;
FIG. 8 is a front elevational view of a modification of the block of the invention;
FIG. 9 is a plan view of the block shown in FIG. 8;
FIG. 10 is a front elevational view of another modification of the block of the invention;
FIG. 11 is a plan view of still another modification of the block of the invention;
FIG. 12 is a front elevational view showing in part a wall formed by laying the block shown in FIG. 11;
FIG. 13 is a plan view of still another modification of the block of the invention;
FIG. 14 is a front elevational view showing in part a wall formed of the block shown in FIG. 13;
FIG. 15 is a plan view showing in part a modification of a rib of a prop member;
FIG. 16 is an elevational view of another embodiment of the invention;
FIG. 17 is a plan view of FIG. 16;
FIG. 18 is a longitudinal sectional side view of a wall formed by laying the blocks of FIG. 17;
FIG. 19 is a plan view of still another modification of the block of the invention;
FIG. 20 is a side elevational view taken along line XX—XX of FIG. 19;
FIG. 21 is a plan view of a wall formed of the blocks of FIG. 19; and
FIG. 22 is a longitudinal sectional view taken along line XXII—XXII of FIG. 21.

Referring now to the drawings, a block proper 1 is rectangular in shape and is formed thick enough to provide a wall surface. As shown in FIGS. 1 and 2, the block proper 1 is provided with projections 2, 3 and 4, 5 which are formed on the right and left sides of the upper and lower edges of the block proper in parallel to the edges. The length of each of said projections is equal to about one quarter of the length of the block proper 1. Quirks 6 and 7 having a length equal to about a half of the length of the block proper are formed in a straight line between said projections arranged in a line. A prop member 8 provided on the rear surface of the block proper 1 and which serves as a stiffener in the invention when the blocks of the invention are laid in the form of a wall is provided in parallel to, namely, vertically of the side edges of the block proper 1. The central line Y of the proper member 8 is preferably fixed at a position moved centrally of the side edge about one quarter of the length of the block proper 1. The prop member 8, therefore, is L-shaped as shown in FIG. 3 when the block proper is overlooked. The vertical height of the prop member, especially on the tail end portion thereof, is made equal to the height of the block proper, namely, to the level of the edge from which the proper member extends. A rib 9 is formed inside or outside of said tail end portion.

Referring now to the manner of laying the block of the invention shown in FIGS. 1 through 3, each block proper in the position shown in FIG. 1 is in the beginning arranged laterally in line A as shown in FIG. 4 and then another block, after it has been turned 180 degrees, namely, upside down so that a prop member 8 may be positioned on the right side in the drawings, is laid in line B, then still another block is laid in line C in the same manner as in line A, and then is laid in line D in the same manner as in line B. When the blocks are laid in this manner by alternative change in position of the prop member 8, the projection 3 of a block $a_1$ in line A is arranged in the same line with the projection 2 of the neighboring block $a_2$ and combined with each other as shown in a longitudinal sectional view of the face plate of the block 1 in FIG. 7. The quirk 6 of the block $b_2$ in line B engages the projection 2 of the block $a_2$ combined with the projection 3 of the block $a_1$ in line A. With the quirk 7 of the block $b_2$ in line B neighboring line C are engaged the projection 5 of the block $c_1$ and the projection 4 of the block $c_2$ in line C both of which projections 4, 5 are arranged in a line and combined. Accordingly, each block proper is combined securely on both sides thereof with the neighboring blocks. Because the projections are engaged with the quirks through halving joint, the longitudinal positon of the blocks are properly and positively fixed, thereby to finally provide a strong wall construction as a whole. Since the prop member 8 is laid in a vertical line as shown in FIGS. 6 and 7, the prop member 8 provides a strong stiffener on the rear side of the wall structure, and accordingly can maintain the wall face in exact plane. Furthermore, a straight vertical space is formed between the prop members arranged in a vertical line and the ground surface, which space is conveniently used for filling rubbles or pouring concrete. A rib 9 protrudes zigzag at the tail end of the prop member, so that, when said space is filled with concrete, the prop members are enabled to keep their jointed position more securely against pressure from waves when the blocks are used as a protection wall on the sea shore or river bank.

There are many modifications of projection and quirk for making halving joint. In FIGS. 8 and 9 is shown one preferred modification. That is to say, on both sides of the upper and lower edges of the block proper are provided projections 12, 13 and 14, 15 which are shorter than those shown in FIG. 1. Between the projections 12 and 13 and between the projections 14 and 15 along the length of the upper and lower edges of the block are formed quirks 16 and 17 which are shorter than those shown in FIG. 1.

That is to say, the length of said quirk 16 is so formed as to be large enough to receive therein and mesh therewith a combined length of the projection 12 and its neighorboring projection 13 of another block to be laid upon the block having the quirk 16. The blocks of the kind described are also provided with prop members 18 having ribs 19 at the tail end thereof, and as described with reference to the embodiments in FIGS. 4 and 7, blocks that are laid upon the initial line of blocks are turned 180 degrees or upside down. The prop members 18 of the blocks thus laid can provide stiffeners constructed and arranged in a vertical line.

FIG. 10 shows a modification in which a pair of right and left projections formed on the upper and lower edges of the block respectively are different in length from each other. On each left side of the upper and lower sides of the block proper 21 are provided projections 22 and 24, and on each right side are formed projections 24 and 25 shorter in length than those on each left side. The quirks 26 and 27 are formed so as to be equal in length to the total length of a combination of said long and short projections. When these blocks of a modified type are laid, the projections 22 and 23 of two blocks neighboring with each other in the upper line fit in with the quirk 26 of the block in the lower line in the same manner as previously described.

There is still another modification of projection and quirk allowing a combination of blocks in a vertical and lateral relation. FIG. 11 shows a modification in which a line of demarcation is drawn centrally of the thickness T of the block proper 31 along the upper and lower edges thereof and projections 32, 33 and 34, 35 are provided rearwardly of the demarcation line i.e. on the rear half side of the block 31 and quirks 36 and 37 are formed between the projections. As is apparent, projections 34 and 35 and quirk 37 are on the lower side surface of the block and quirk 36 is formed large enough to mesh with the two projections which are to be combined when two blocks are arranged.

The blocks of the modified type as above described are laid in the manner shown in FIG. 12. As previously described with reference to other embodiments with alternate rows of blocks being in reversed array, the prop member 38 having a rib 39 at the tail end thereof forms a stiffener arranged in a vertical line on the back side of a wall structure.

FIG. 13 shows another embodiment of the invention in which a quirk is formed to mesh with a projection formed on the front half side of the block edge having a thickness T. In the embodiment are formed projections 42, 43 and 44, 45 on the front half side of the upper and lower edges of the block having a thickness T and quirks 46 and 47 are provided between said projections. The front of the wall laid with the blocks of the type described is shown in FIG. 14, in which the joint of the projections and the quirks is bared on the panel surface of the block, but in which a wall surface having novelty in decorative appearance is provided when a panel 50 is formed as shown in FIG. 13. The prop member 48 together with the rib 49 at the tail end thereof forms a stiffener behind the wall in the same manner as in the previous embodiments described and illustrated. The rib of the prop member 8 may be formed to protrude on both sides as shown in FIG. 15. When a rib 9' is formed symmetrically on both sides of the prop member, it is not arranged zigzag between the blocks in the lower line and those being laid thereon, but arranged as shown in FIG. 6. But when cement is poured behind the wall surface, it can be poured between the stiffeners without leaving any space unfilled.

The strength of the block can be greatly increased by further improving the shape of the L-shaped cross section of the block of the invention. A typical embodiment is shown in FIGS. 16 and 17. This block is formed in such a manner that the portion from which the prop member extends is made progressively larger in thickness than the other portions of the block. Projections 52, 53 and 54, 55 are formed at both ends of the upper and lower edges and quirks 56 and 57 are formed between the projections in the same manner as described in the previous embodiments. Further useful modifications may be introduced in the prop member. The prop member shown in FIG. 16 is symmetrically cut away on the upper and lower edges thereof as indicated at 60 and 61. The manner in which the block having this modified prop member is laid is shown in FIG. 18 in which the stiffener formed behind the wall is shown having a hole 62 laterally formed by said cutaway portions 60 and 61 of the prop member being arranged face to face with each other. When the space defined by the wall and ground surfaces is filled with stones such as rubbles or concrete in the case of the block having the stiffener of the described structure, such a filler enters said lateral hole 62 and joins with one another, preventing more positively the block from moving or shifting. Moreover, when more strength is required of a wall construction portion, steel bars may be inserted into said lateral hole 62 and a filler may be poured thereinto, thereby to form a block wall *a* having in combination the strength of a reinforced steel concrete structure. Another advantage of the block the prop member of which is provided with said lateral hole 62 is that when the block is used as, for example, a protection wall of the river bank and water comes in between the block wall and the ground surface, the water disperses through the lateral hole if the space between the wall and the ground surface is filled with rubbles only, with the result that there is provided an effective means for preventing the water from being held only at one place behind the wall, and accordingly the formation of water pressure which might push away the wall. For this purpose a block 64 having a drain hole 63 formed on the face plate thereof is used. Furthermore, the block normally is 50 cm. in length, 30 cm. in height, and weighs 50 kg., so that it requires a considerable amount of labor in handling. Especially the efficiency of laying the block depends much upon what portion of the block the block worker will take in his hand when laying the block. When the block is provided with the cutaway portions 60 and 61 of the kind described, the the worker feels convenience in carrying and laying and hence in handling with an increased efficiency.

FIGS. 19 and 20 show another modification of the block of the invention in which the rib of the prop member has been effectively improved. The rib 79 of the prop member 78 of the block 71 is protruded outwardly and a projection 81 having an inclined surface 80 inside thereof is formed on the upper and lower portions of the outwardly protruded portion. Projections 72 and 73 formed on the block for purposes of halving joint are provided centrally of the upper and lower edges of the surface plate of the block along the half length of the surface plate and quirks 74, 75 and 76, 77 are formed on the right and left sides of the upper and lower edges, respectively. When the blocks 71 of the kind described are laid in the same manner as those shown laid in the previous embodiments illustrated, the projection of the prop member of a block to be laid on the block in the lower line is, as shown in FIG. 22, guided on the projection 81 having said inclined surface 80 thereby to join the block in the upper line to the block in the lower line. Consequently, the block having the projection 81 formed in the prop member thereof in the upper and lower lines makes it possible for the block worker to lay blocks in a line more easily than when he lays those having no such projections formed in the prop members, and hence he can make more exact halving joint.

As apparent from each of the embodiments illustrated, the block provided by the invention for use as a stone wall material shows many improvements and advantages. It should be understood that the material used in the block of the invention is not limited to concrete but that such other burned products as brick or ceramics may be used. Furthermore, it should be understood that the embodiments described and illustrated herein are by way of example and not in a limiting sense and in consequence various changes, modifications and combinations thereof can be made without departing from the scope and spirit of the invention.

What is claimed is:
1. A block for use in the construction of a wall for the protection of river banks or sea shores comprising a face plate having a thickness in the form of a rectangular wall long in a lateral direction, said face plate having on both sides of the upper and lower edges thereof projections extending along a quarter of the length of the face plate, a quirk extending in a straight line between a pair of said projections on the upper and lower edges, said quirk being formed to correspond in length to said pair of projections joined in a line, said projections and said quirk having a shape to be joined in the form of halving joint, a prop member oriented in a generally vertical plane and having a height substantially equal to the height of said face plate and extending rearwardly behind the face plate from a position spaced inwardly from the end of the face plate a distance substantially equal to one quarter of the length of the face plate, and a rib formed on one side of the tail end of said prop member and extending substantially parallel to said face plate.

2. A block for use in the construction of a wall for the protection of river banks or sea shores according to claim 1 in which projections formed on the right and left sides of the upper and lower edges of the block face plate are shorter than one quarter of the length of the face plate of the block and a quirk is formed centrally of the upper and lower edges of the block face plate.

3. A block for use in the construction of a wall for the protection of river banks or sea shores according to claim 1 in which one of the right and left projections is formed longer and the other is formed shorter and a quirk is formed between the projections.

4. A block for use in the construction of a wall for the protection of river banks or sea shores according to claim 1 in which a pair of projections are formed on the rear half side of the thickness of the face plate on the upper and lower edges thereof and a quirk is formed between the projections.

5. A block for use in the construction of a wall for the protection of river banks or sea shores according to claim 1 in which a pair of projections are formed on the front half side of the thickness of the face plate on the upper and lower edges thereof and a quirk is formed between the projections.

6. A block for use in the construction of a wall for the protection of river banks or sea shores according to claim 1 in which the face plate of the block is formed progressively larger in thickness on the back side thereof in proportion as it nears the portion from which the prop member extends and the prop member is formed progressively larger in thickness in proportion as it nears the face plate from which the prop member extends to the tail end thereof.

7. A block for use in the construction of a wall for the protection of river banks or sea shores according to claim 1 in which the prop member is provided on the same portions of the upper and lower edges thereof with cutaway portions.

8. A block for use in the construction of a wall for the protection of river banks or sea shores according to claim 1 in which the rib of the prop is provided with a projection having an inwardly inclined surface at the upper and lower ends of the rib.

9. A block for use in the construction of a wall for the protection of river banks or sea shores according to claim 1 in which projection having a half of the length of the face plate are formed centrally of the upper and lower edges of the face plate of the block and quirks having one quarter of the length of the face plate are formed on both sides of the upper and lower edges of the face plate.

References Cited

UNITED STATES PATENTS 1,909,539   5/1933   Huntoon _____ 61—47

FOREIGN PATENTS

| 119,434 | 1/1945 | Australia. |
| 493,473 | 8/1919 | France. |
| 1,210,233 | 3/1960 | France. |
| 235,873 | 4/1926 | Great Britain. |
| 455,175 | 2/1950 | Italy. |

JACOB SHAPIRO, *Primary Examiner.*